(12) United States Patent
Krasberg et al.

(10) Patent No.: US 10,261,479 B2
(45) Date of Patent: Apr. 16, 2019

(54) METHOD FOR OPERATING A FACILITY DESIGNED FOR PERFORMING AT LEAST ONE CHEMICAL REACTION

(71) Applicant: BAYER AKTIENGESELLSCHAFT, Leverkusen (DE)

(72) Inventors: Nicolai Krasberg, Langenfeld (DE); Lukas Hohmann, Hünxe (DE)

(73) Assignee: Bayer Aktiengesellschaft, Leverkusen (DE)

( * ) Notice: Subject to any disclaimer, the term of this patent is extended or adjusted under 35 U.S.C. 154(b) by 110 days.

(21) Appl. No.: 15/036,439

(22) PCT Filed: Nov. 11, 2014

(86) PCT No.: PCT/EP2014/074268
§ 371 (c)(1),
(2) Date: May 13, 2016

(87) PCT Pub. No.: WO2015/071259
PCT Pub. Date: May 21, 2015

(65) Prior Publication Data
US 2016/0299477 A1  Oct. 13, 2016

(30) Foreign Application Priority Data
Nov. 15, 2013 (EP) ..................... 13193132

(51) Int. Cl.
*G05B 13/02* (2006.01)
*B01J 19/00* (2006.01)
(52) U.S. Cl.
CPC ........ *G05B 13/024* (2013.01); *B01J 19/0033* (2013.01); *B01J 2219/00211* (2013.01)
(58) Field of Classification Search
CPC ................ G05B 13/024; B01J 19/0033; B01J 2219/00211
See application file for complete search history.

(56) References Cited

U.S. PATENT DOCUMENTS 5,518,700 A    5/1996   Ayoub et al.
7,461,038 B2  12/2008   Kropaczek et al.
(Continued)

FOREIGN PATENT DOCUMENTS

DE   10 2006 060 494 A1   7/2007
EP         1615232 A2      1/2006
(Continued)

*Primary Examiner* — Shogo Sasaki
(74) *Attorney, Agent, or Firm* — McBee Moore Woodward & Vanik IP, LLC

(57) ABSTRACT

Methods operate a plant set up for performing at least one chemical reaction, wherein said method comprises providing process reactors of optimal technical and economic suitability for forming the production plant and wherein this providing operation comprises selecting in at least partially automated fashion the process reactors of optimal technical and economic suitability for forming the production plant from a multiplicity of process reactors taking account of reactor-specific technical parameters assigned to the process reactors of the multiplicity of process reactors and recorded in a database and of predefined process-specific technical criteria by performing at least one selection step for each process reactor of the multiplicity of process reactors which comprises verifying whether at least one reactor-specific technical parameter assigned to this process reactor and/or at least one process-specific and reactor-specific technical target value derived from at least one reactor-specific technical parameter assigned to this process reactor and from at least one process-specific technical parameter fulfils at least one process-specific technical criterion.

10 Claims, 3 Drawing Sheets

(56) References Cited

U.S. PATENT DOCUMENTS

Figure 1:
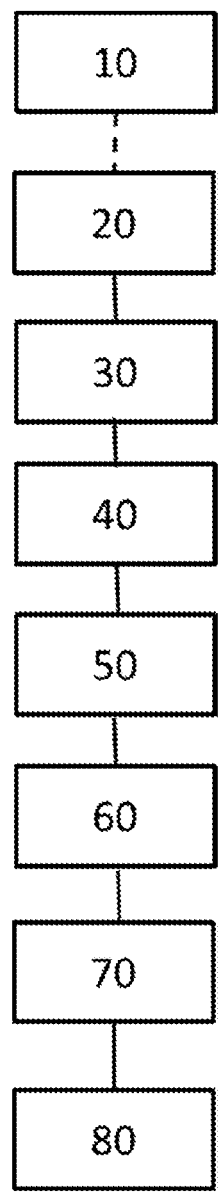

| | | | |
|---|---|---|---|
| 2003/0223909 A1 | 12/2003 | Oberbeck et al. | |
| 2007/0179919 A1 | 8/2007 | Kropaczek et al. | |
| 2009/0222108 A1* | 9/2009 | Lou .................... | G05B 13/04 700/29 |

FOREIGN PATENT DOCUMENTS

| | | |
|---|---|---|
| IN | 02590KN2007 A | 8/2007 |
| JP | H10-502014 A | 2/1998 |
| JP | 2006-17718 A | 1/2006 |
| JP | 2006-195735 A | 7/2006 |

* cited by examiner

METHOD FOR OPERATING A FACILITY DESIGNED FOR PERFORMING AT LEAST ONE CHEMICAL REACTION

The work which led to this invention was sponsored by grant agreement no. 228867 as part of the European Union's seventh framework program RP7/2007-2013.

This application is a 371 application of PCT/EP2014/074268, filed Nov. 11, 2014, which claims foreign priority benefit under 35 U.S.C. § 119 of European Application No. EP 13193132.1, filed Nov. 15, 2013.

The present invention relates to a method of operating a plant set up for performing at least one chemical reaction.

The invention further relates to a computer program comprising program code means stored on a computer-readable data storage medium, to a data storage medium and to a computer system.

In order to perform a chemical reaction for producing a particular chemical product it is necessary to provide a production plant having an individually designed plant structure. In order to be able to carry out the process steps required from a process engineering perspective in individual process stages, technically suitable process reactors must be selected and combined with one another to form a production plant.

There are typically a great many process reactors available and there are generally also various process reactors present with which a particular process step may be carried out. The planning of a production plant in terms of its technical configurations and its economic viability is therefore very complex. There is therefore a need to simplify the planning of economically and technically optimized production plants.

It is an object of the invention to facilitate rapid and optimal planning of a plant set up for performing at least one chemical reaction taking into account the largest possible multiplicity of boundary conditions.

This object is achieved by a method, a computer program, a data storage medium and a computer system having features disclosed hereinafter. Preferred embodiments are set forth throughout the present disclosed which may each constitute an aspect of the invention on their own or in any desired combination with one another.

The present disclosure is directed to a method of operating a plant set up for performing at least one chemical reaction, wherein said method comprises providing process reactors of optimal technical and economic suitability for forming the production plant and wherein this providing operation comprises selecting in at least partially automated fashion the process reactors of optimal technical and economic suitability for forming the production plant from a multiplicity of process reactors taking account of reactor-specific technical parameters assigned to the process reactors of the multiplicity of process reactors and recorded in a database and of predefined process-specific technical criteria by performing at least one selection step for each process reactor of the multiplicity of process reactors which comprises verifying whether at least one reactor-specific technical parameter assigned to this process reactor and/or at least one process-specific and reactor-specific technical target value derived from at least one reactor-specific technical parameter assigned to this process reactor and from at least one process-specific technical parameter fulfils at least one process-specific technical criterion.

The operation of providing the process reactors of optimal technical and economic suitability for forming the production plant comprises not only physical provision but also, in particular, the provision of reactor-specific technical parameters for a multiplicity of process reactors in a reactor database. Individual process reactors of optimal technical and economic suitability for forming a particular production plant may be selected from this reactor database in the course of the at least partially automated selecting operation. This selecting operation takes account not only of the reactor-specific technical parameters but also of predefined process-specific technical criteria. The process-specific technical criteria may be of a very wide variety of types. For example, process-specific technical criteria may be in the form of boundary conditions to be met for process steps to be carried out.

The at least partially automated selecting operation comprises performing at least one selection step for each process reactor of the multiplicity of process reactors which comprises verifying whether at least one reactor-specific technical parameter assigned to this process reactor and/or at least one process-specific and reactor-specific technical target value derived from at least one reactor-specific technical parameter assigned to this process reactor and from at least one process-specific technical parameter fulfils at least one process-specific technical criterion. A process-specific and reactor-specific technical target value may be, for example, a process reactor dwell time resulting from a model equation and this target value may be derived taking account of the reactor volume as a reactor-specific technical parameter and of a planned volume flow and maximum permissible dwell times as process-specific technical parameters. When a process-specific and reactor-specific technical target value is derived without taking account of a process-specific technical parameter, the target value may be provided, for example, directly via a reactor-specific technical parameter, for example a reactor temperature or the like.

The at least partially automated selecting operation may also comprise two or more selection steps. A partially automated selecting operation may comprise selecting a plurality of suitable process reactors and providing this selection, for example as a graphical representation, to planning staff in order that the planning staff may carry out a final selection step. The selecting operation may alternatively be effected in fully automatic fashion by final selection of a particular process reactor/a particular combination of process reactors without intervention by planning staff.

In an advantageous embodiment the at least partially automated selecting operation comprises at least two successive selection steps, wherein said selection steps differ from one another at least in the respective process-specific technical criteria and the reactor-specific technical parameters/process-specific and reactor-specific technical target values compared therewith. For example a first selection step may comprise selecting process reactors having permissible dwell times from the multiplicity of process reactors, at least one process reactor having a permissible operating pressure then being selected from these selected process reactors. The number of possible selection steps may increase with increasing number of available parameters of different types.

In a further advantageous embodiment the at least partially automated selecting of the process reactors of optimal technical and economic suitability for forming the production plant from the multiplicity of process reactors is carried out taking account of technical information concerning possible serial and/or parallel arrangements of process reactors stored in a database. Arranging process reactors/reactor channels formed by process reactors in parallel allows the production capacity of a reactor channel to be increased.

Arranging process reactors/reactor channels in parallel and/or series moreover allows process volume and dwell time to be increased. This is taken into account in this embodiment of the method.

A further advantageous embodiment provides that the process-specific technical criterion is defined by a process-specific threshold parameter which when exceeded or fallen below results in the process engineering criterion being met or by a process-specific parameter range which when adhered to results in the process engineering criterion being met. Comparison of reactor-specific technical parameters and/or process-specific and reactor-specific technical target values with the process-specific threshold parameter/the process-specific parameter range makes it possible to determine whether a process-specific technical criterion has been met.

The process-specific technical criterion advantageously takes into account whether
- a mass throughput through a process reactor required to perform a particular chemical reaction is possible,
- a dwell time for a process reactor for performing a particular chemical reaction is permissible,
- an operating pressure and/or a pressure drop for a process reactor for performing a particular chemical reaction is permissible,
- a heat transfer performance for a process reactor for performing a particular chemical reaction is permissible,
- suitable kinetics of reaction and mixing are present in a reactor during performance of a particular chemical reaction,
- thermally safe operation of a process reactor during performance of a particular chemical reaction is ensured,
- a temperature at a hotspot in a process reactor for performing a particular chemical reaction is permissible, or
- sufficiently thorough initial mixing of reactants by means of a process reactor during performance of a particular chemical reaction is achievable. Which of these process-specific technical criteria are taken into account depends on the particular circumstances, requirements and technical configurations of process reactors.

The present disclosure is also directed to a computer program comprising program code means stored on a computer-readable data storage medium which prompt a computer or an appropriate processing unit to carry out a method according to any of the abovementioned embodiments or any desired combination thereof when they are run on the computer/the appropriate processing unit. The abovementioned advantages cited in connection with the method apply correspondingly to this computer program.

Moreover, the present disclosure is directed to a data storage medium comprising an abovementioned computer program. The abovementioned advantages cited in connection with the method/the computer program apply correspondingly to this data storage medium.

Furthermore, the present disclosure is directed to a computer system having an abovementioned computer program loaded onto it. The abovementioned advantages cited in connection with the method/the computer program apply correspondingly to this computer system.

The invention is elucidated hereinbelow by way of example with reference to the accompanying figures with the aid of preferred exemplary embodiments and the features specified below may constitute an aspect of the invention either on their own or in combination with one another.

Figure 2:
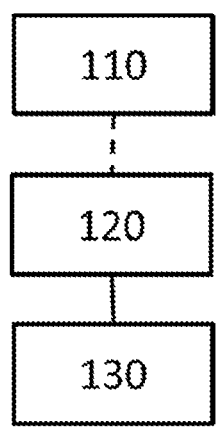
Figure 3:
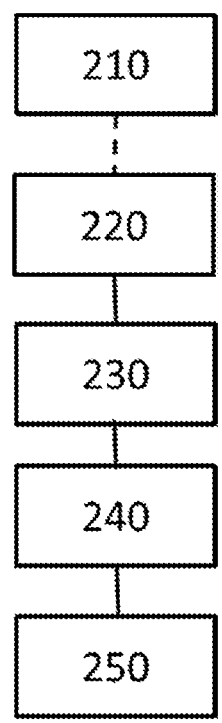

FIG. 1 shows: a schematic representation of an exemplary procedure for a method according to the invention, FIG. 2 shows: a schematic representation of a further exemplary procedure for a method according to the invention and FIG. 3 shows: a schematic representation of a further exemplary procedure for a method according to the invention.

FIG. 1 shows a schematic representation of an exemplary procedure for a method according to the invention, wherein this embodiment comprises selecting in at least partially automated fashion process reactors of optimal technical and economic suitability for forming a desired production plant in the form of dwell time channel reactors from a multiplicity of process reactors taking account of reactor-specific technical parameters assigned to the process reactors of the multiplicity of process reactors and recorded in a database and of predefined process-specific technical criteria. The at least partially automated selecting operation comprises seven successive selection steps, wherein said selection steps differ from one another at least in the respective process-specific technical criteria and the reactor-specific technical parameters/process-specific and reactor-specific technical target values compared therewith.

Maintenance of the database to which recourse is made for selection of process reactors is performed in an upstream step 10. This maintenance comprises inputting at least reactor-specific technical parameters into the database in manual or automated fashion.

Step 20 comprises performing a first selection step which comprises verifying for each process reactor of the multiplicity of process reactors whether at least one reactor-specific technical parameter assigned to this process reactor in the form of a parameter range for the possible mass throughput through the process reactor fulfils a process-specific technical criterion, namely whether a planned mass throughput through a process reactor necessary for performing a particular chemical reaction is possible. If a planned mass throughput through a process reactor cannot be achieved it is possible to verify whether a small adjustment of the planned mass throughput is possible in order to achieve a mass throughput in the reactor-specific parameter range for the possible mass throughput through the process reactor. The result of step 20 is a selection of process reactors exhibiting permissible mass throughputs.

Step 30 comprises performing a further selection step which comprises verifying for each process reactor of the selection of process reactors obtained in step 20 whether a process-specific and reactor-specific technical target value in the form of a dwell time for the particular process reactor and derived using a model equation from a reactor-specific technical parameter assigned to this process reactor in the form of the particular reactor volume and from process-specific technical parameters in the form of a parameter range for permissible dwell times and a planned volume flow fulfils a process-specific technical criterion, namely whether the dwell time is in the parameter range for permissible dwell times. If the dwell time of a process reactor is not in the parameter range for permissible dwell times it is possible to verify whether a small adjustment of the planned mass throughput is possible in order to achieve the parameter range for permissible dwell times. The result of step 30 is a further selection of process reactors exhibiting a permissible dwell time.

Step 40 comprises performing a further selection step which comprises verifying for each process reactor of the selection of process reactors obtained in step 30 whether a reactor-specific technical parameter assigned to this process reactor in the form of a possible operating pressure in the process reactor fulfils a process-specific technical criterion, namely whether the process reactor operating pressure and/or a pressure drop derived therefrom is permissible for performing a particular chemical reaction. The result of step 40 is a further selection of process reactors exhibiting a permissible operating pressure/a permissible pressure drop.

Step 50 comprises performing a further selection step which comprises verifying for each process reactor of the selection of process reactors obtained in step 40 whether a process-specific and reactor-specific technical target value derived from a reactor-specific technical parameter assigned to this process reactor in the form of geometric properties of the process reactor and from at least one process-specific technical parameter in the form of a planned mass throughput fulfils a process-specific technical criterion, namely whether flow conditions in the process reactor are suitable for performing the desired chemical reaction. This makes it possible to compare process reactors having different geometric properties. The result of step 50 is a further selection of process reactors exhibiting suitable flow conditions.

Step 60 comprises performing a further selection step which comprises verifying for each process reactor of the selection of process reactors obtained in step 50 whether a process-specific and reactor-specific technical target value in the form of a possible heat transfer performance of the process reactor and derived from at least one reactor-specific technical parameter assigned to this process reactor and from at least one process-specific technical parameter fulfils a process-specific technical criterion, namely whether a heat transfer performance of a process reactor is permissible for performing a particular chemical reaction. The result of step 60 is a further selection of process reactors exhibiting suitable heat transfer performance.

Step 70 comprises performing a further selection step which comprises verifying for each process reactor of the selection of process reactors obtained in step 60 whether a process-specific and reactor-specific technical target value in the form of kinetics of reaction and mixing in the process reactor during performance of a particular chemical reaction and derived from at least one reactor-specific technical parameter assigned to this process reactor and from at least one process-specific technical parameter fulfills a process-specific technical criterion, namely whether suitable reaction and mixing kinetics are present in the reactor during performance of a particular chemical reaction. This can also verify whether sufficiently thorough initial mixing of reactants by means of the process reactor during performance of a particular chemical reaction is achievable. The result of step 70 is a further selection of process reactors exhibiting suitable reaction and mixing kinetics in the reactor during performance of a particular chemical reaction.

Step 80 comprises performing a further selection step which comprises verifying for each process reactor of the selection of process reactors obtained in step 70 whether a process-specific and reactor-specific technical target value derived from at least one reactor-specific technical parameter assigned to this process reactor and from at least one process-specific technical parameter fulfils a process-specific technical criterion, namely whether thermally safe operation of the process reactor during performance of a particular chemical reaction is ensured. This can also verify whether a temperature at a hotspot in the particular process reactor for performing a particular chemical reaction is permissible. The result of step 80 is a further selection of process reactors which ensure thermally safe operation of the process reactor during performance of a particular chemical reaction.

FIG. 2 shows a schematic representation of an exemplary procedure for a method according to the invention, wherein this embodiment comprises selecting in at least partially automated fashion process reactors of optimal technical and economic suitability for forming a desired production plant in the form of mixing units from a multiplicity of process reactors taking account of reactor-specific technical parameters assigned to the process reactors of the multiplicity of process reactors and recorded in a database and of predefined process-specific technical criteria. The at least partially automated selecting operation comprises two successive selection steps, wherein said selection steps differ from one another at least in the respective process-specific technical criteria and the reactor-specific technical parameters/process-specific and reactor-specific technical target values compared therewith.

Maintenance of the database to which recourse is made for selection of process reactors is performed in upstream step 110. This maintenance comprises inputting at least reactor-specific technical parameters into the database in manual or automated fashion.

Step 120 comprises performing a selection step which comprises verifying for each process reactor of the multiplicity of process reactors whether a reactor-specific technical parameter assigned to this process reactor in the form of a possible operating pressure in the process reactor fulfils a process-specific technical criterion, namely whether the process reactor operating pressure and/or a pressure drop derived therefrom is permissible for performing a particular chemical reaction. The result of step 120 is a further selection of process reactors exhibiting a permissible operating pressure/a permissible pressure drop.

Step 130 comprises selecting a separate process reactor which does not have a dwell time sector arranged downstream thereof.

FIG. 3 shows a schematic representation of an exemplary procedure for a method according to the invention, wherein this embodiment comprises selecting in at least partially automated fashion process reactors of optimal technical and economic suitability for forming a desired production plant in the form of continuous stirred tank reactors from a multiplicity of process reactors taking account of reactor-specific technical parameters assigned to the process reactors of the multiplicity of process reactors and recorded in a database and of predefined process-specific technical criteria. The at least partially automated selecting operation comprises four successive selection steps, wherein said selection steps differ from one another at least in the respective process-specific technical criteria and the reactor-specific technical parameters/process-specific and reactor-specific technical target values compared therewith.

Maintenance of the database to which recourse is made for selection of process reactors is performed in upstream step 210. This maintenance comprises inputting at least reactor-specific technical parameters into the database in manual or automated fashion.

Step 220 comprises performing a selection step which comprises verifying for each process reactor of the multiplicity of process reactors whether a reactor-specific technical parameter assigned to this process reactor in the form of a possible operating pressure in the process reactor fulfils a process-specific technical criterion, namely whether the process reactor operating pressure and/or a pressure drop derived therefrom is permissible for performing a particular chemical reaction. The result of step 220 is a further selection of process reactors exhibiting a permissible operating pressure/a permissible pressure drop.

Step 230 comprises performing a further selection step which comprises verifying for each process reactor of the selection of process reactors obtained in step 220 whether a process-specific and reactor-specific technical target value in the form of a dwell time for the particular process reactor and derived using a model equation from a reactor-specific technical parameter assigned to this process reactor in the form of the particular reactor volume and from process-specific technical parameters in the form of a parameter range for permissible dwell times and a planned volume flow fulfils a process-specific technical criterion, namely whether the dwell time is in the parameter range for permissible dwell times. If the dwell time of a process reactor is not in the parameter range for permissible dwell times it is possible to verify whether a small adjustment of the planned mass throughput is possible in order to achieve the parameter range for permissible dwell times. The result of step 230 is a further selection of process reactors exhibiting a permissible dwell time.

Step 240 comprises performing a further selection step which comprises verifying for each process reactor of the selection of process reactors obtained in step 230 whether a process-specific and reactor-specific technical target value in the form of a possible heat transfer performance of the process reactor and derived from at least one reactor-specific technical parameter assigned to this process reactor and from at least one process-specific technical parameter fulfils a process-specific technical criterion, namely whether a heat transfer performance of a process reactor is permissible for performing a particular chemical reaction. The result of step 240 is a further selection of process reactors exhibiting suitable heat transfer performance.

Step 250 comprises performing a further selection step which comprises verifying for each process reactor of the selection of process reactors obtained in step 240 whether a process-specific and reactor-specific technical target value derived from a reactor-specific technical parameter assigned to this process reactor in the form of geometric properties of the process reactor and from at least one process-specific technical parameter in the form of a planned mass throughput fulfils a process-specific technical criterion, namely whether flow conditions in the process reactor are suitable for performing the desired chemical reaction. This makes it possible to compare process reactors having different geometric properties. The result of step 250 is a further selection of process reactors exhibiting suitable flow conditions.

The invention claimed is:

1. A computer-implemented method of setting up a plant for performing a plurality of chemical reactions, the plant comprising a plurality of stirring process reactors, the method comprising:
    automatically selecting via a computer, a first at least one process reactor from a plurality of process reactors;
        wherein each of said selected first at least one process reactor possesses a first at least one process-specific target value and a first at least one reactor-specific technical target value of said plant; and,
    verifying via said computer, said selected first at least one process reactor possesses said first at least one process-specific technical parameter, and said first at least one reactor-specific technical parameter;
    excluding, via said computer, from the performance of said plurality of chemical reactions by said plant, each of said plurality of stirring process reactors that lacks said first at least one process-specific target value and said first at least one reactor-specific technical target value of said plant thereby creating a plurality of selected process reactors;
    repeating said selecting, verifying, and excluding steps 0 to n times in succession;
        wherein each repeated selecting step selects via said computer an at least one process reactors from said plurality of selected process reactors;
            wherein each of said selected at least one process reactor possesses a different at least one process-specific target value and a different at least one reactor-specific technical target value of said plant;
        wherein each repeated verifying step via said computer verifies said at least one process reactor possesses said at least one different process-specific technical parameter and said at least one different reactor-specific technical parameter; and,
        wherein each repeated excluding step removes from the performance of said plurality of chemical reactions by said plant each process reactor of said plurality of selected process reactors that lacks said at least one different process-specific target values and said at least one different reactor-specific technical target values of said plant thereby creating a reduced plurality of selected process reactors; and,
    providing to said plant said reduced plurality of selected process reactors after n repetitions.

2. The method of claim 1 further comprising:
    confirming said selected first at least one process reactor includes a first at least one process-specific target value and a first at least one reactor-specific technical target value;
    wherein the first at least one process-specific target value and the first at least one reactor-specific technical target value fulfills at least one process-specific technical criterion; and,
    repeating said confirming step 0 to n times.

3. The method according to claim 1, wherein the automated selection of the at least one process reactor from the plurality of process reactors is carried out utilizing technical information regarding serial and parallel arrangements of process reactors stored in a database.

4. The method according to claim 1 wherein the first at least one reactor-specific technical parameter is selected from the group of reactor volume, reactor temperature, reactor operating pressure and reactor geometric properties.

5. The method according to claim 2 wherein the at least one process-specific technical criterion is selected from the group consisting of:
    a mass throughput through a process reactor,
    a dwell time for a process reactor,
    an operating pressure,
    a pressure drop,
    a heat transfer performance,
    suitable kinetics of reaction and mixing,
    thermally safe operation,
    a temperature at a hotspot in a process reactor and;
    sufficiently thorough initial mixing of reactants.

6. The method of claim 2 wherein at least one of each of the first at least one reactor-specific technical parameter and at least one of the first at least one process-specific technical parameter is a range having a minimum value and a maximum value.

7. A computer program product comprising at least one non-transitory computer-readable medium, the at least one computer-readable medium comprising a program to set up a chemical plant having a plurality of stirring reactors, which when executed by a device having a computer or processor, causes the device to:

automatically select via said program, a first at least one process reactor from said plurality of process reactors;
        wherein said selected first at least one process reactor possesses a first at least one process-specific target value and a first at least one reactor-specific technical target value of said chemical plant; and, verify, via said program, said selected at least one process reactor possesses said first at least one process-specific technical parameter and said first at least one reactor-specific technical parameter;

confirm, via said program, said selected first at least one process reactor includes said first at least one process-specific target value and said first at least one reactor-specific technical target value and, exclude, via said program, from the performance of said plurality of chemical reactions performed by said chemical plant each reactor of said plurality of reactors that lacks said first at least one process-specific target value and said first at least one reactor-specific technical target value thereby creating a plurality of selected process reactors;

repeating said select, verify, confirm, and exclude steps 0 to n times in succession;
        wherein each repeated selection step selects via said computer an at least one process reactors from said plurality of selected process reactors;
            wherein each of said selected at least one process reactor possesses a different at least one process-specific target value and a different at least one reactor-specific technical target value of said plant;
        wherein each repeated verification step via said computer verifies said at least one process reactor possesses said at least one different process-specific technical parameter and said at least one reactor-specific technical parameter; and,
        wherein each repeated exclusion step excludes from the performance of said plurality of chemical reactions by said plant each process reactor of said plurality of selected process reactors that lack said at least one different process-specific target values and said at least one reactor-specific technical target values of said plant thereby creating a reduced plurality of selected process reactors; and, providing to said plant said reduced plurality of selected process reactors after n repetitions.

8. The computer program product of claim 7, this claim depended on wherein the first at least one of each of the at least one reactor-specific technical parameters and the first at least one process-specific technical parameter value is a range having a minimum value and a maximum value.

9. A system for setting up a plant for performing a plurality of chemical reactions, the plant comprising a plurality of reactors, the system comprising at least one computer or processor, the at least one computer or processor configured to:

automatically select, via said at least one computer or processor, a first at least one process reactor from a plurality of process reactors;
        wherein said selected first at least one process reactor possesses a first at least one process-specific technical target value and a first at least one reactor-specific technical target value of said plant;

verify, via said at least one computer or processor, said selected at least one process reactor possesses said first at least one process-specific technical parameter and said first at least one reactor-specific technical parameter;

confirm, via said at least one computer or processor, said selected first at least one process reactor includes a first at least one process-specific target value and a first at least one reactor-specific technical target value;

exclude, via said at least one computer or processor, from performing said plurality of said chemical reactions by said plant each reactor of said plurality of reactors that lacks said first at least one process-specific target value and said first at least one reactor-specific technical target value; and thereby creating a plurality of selected process reactors;

repeating said select, verify, confirm, and exclude steps 0 to n times in succession;
        wherein each repeated selection step selects via said computer an at least one process reactors from said plurality of selected process reactors;
            wherein each of said selected at least one process reactor possesses a different at least one process-specific target value and a different at least one reactor-specific technical target value of said plant;
        wherein each repeated verification step via said computer verifies said at least one process reactor possesses said at least one different process-specific technical parameter and said at least one reactor-specific technical parameter; and,
        wherein each repeated exclusion step excludes from the performance of said plurality of chemical reactions by said plant each process reactor of said plurality of selected process reactors that lacks said at least one different process-specific target values and said at least one reactor-specific technical target values of said plant thereby creating a reduced plurality of selected process reactors; and, providing to said plant said reduced plurality of selected process reactors after n repetitions.

10. The system of claim 9 wherein the first at least one of each of the at least one reactor-specific technical parameter and the first at least one process-specific technical parameter are each a range having a minimum value and a maximum value.

* * * * *